(12) United States Patent
Pahwa et al.

(10) Patent No.: US 10,051,419 B2
(45) Date of Patent: Aug. 14, 2018

(54) LOCATION DETERMINATION USING COMMUNICATIVELY COUPLED ELECTRONIC DEVICES

(71) Applicant: Apple Inc., Cupertino, CA (US)

(72) Inventors: Aroon Pahwa, Palo Alto, CA (US); Matthew B. Ball, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/842,776

(22) Filed: Sep. 1, 2015

(65) Prior Publication Data

US 2016/0066149 A1 Mar. 3, 2016

Related U.S. Application Data

(60) Provisional application No. 62/044,941, filed on Sep. 2, 2014.

(51) Int. Cl.
*H04W 4/02* (2018.01)
*G06T 11/60* (2006.01)
(Continued)

(52) U.S. Cl.
CPC ......... *H04W 4/023* (2013.01); *G01S 5/0072* (2013.01); *G01S 19/48* (2013.01); *G01S 19/49* (2013.01);
(Continued)

(58) Field of Classification Search
CPC ......... H04L 67/12; H04L 67/18; H04L 67/04; H04L 67/42; H04W 4/026; H04W 4/027;
(Continued)

(56) References Cited

U.S. PATENT DOCUMENTS

| 9,107,040 B2 | 8/2015 | Rottler et al. |
| 2002/0049742 A1* | 4/2002 | Chan ................. G06F 17/3087 |

(Continued)

FOREIGN PATENT DOCUMENTS

| EP | 2515559 | 10/2012 |
| WO | 2016036771 A1 | 3/2016 |

OTHER PUBLICATIONS

PCT/US2015/047995, filed Sep. 1, 2015, Apple Inc.
(Continued)

*Primary Examiner* — Quan M Hua
(74) *Attorney, Agent, or Firm* — Invoke

(57) ABSTRACT

The present disclosure relates to systems and processes for selecting location data provided by communicatively coupled electronic devices. In one example process, a first electronic device can select one of a first location determined by the first electronic device and a second location determined by a second electronic device for use as the location of the first electronic device. The selection can be made based on one or more of the times the first and second locations were determined, accuracies of the first and second location determinations, whether or not the first and second locations intersect, priorities associated with source used to determine the first and second locations, and previous location determinations made by the first electronic device. The selected location can be used as the location of the first electronic device to execute an application on the first electronic device.

20 Claims, 12 Drawing Sheets

System
600

(51) Int. Cl.
*G06F 3/0484* (2013.01)
*G06F 3/0488* (2013.01)
*G06F 21/54* (2013.01)
*G01S 19/48* (2010.01)
*G01S 19/49* (2010.01)
*G01S 5/00* (2006.01)
*H04W 4/80* (2018.01)
*H04W 4/00* (2018.01)

(52) U.S. Cl.
CPC ........ *G06F 3/0488* (2013.01); *G06F 3/04842* (2013.01); *G06F 21/54* (2013.01); *G06T 11/60* (2013.01); *G06F 2221/2111* (2013.01); *H04W 4/008* (2013.01); *H04W 4/80* (2018.02)

(58) Field of Classification Search
CPC ......... H04W 4/80; H04W 4/02; H04W 4/021; H04W 4/029; H04W 88/06; H04M 1/72527
See application file for complete search history.

(56) References Cited

U.S. PATENT DOCUMENTS

| | | | |
|---|---|---|---|
| 2003/0035544 A1* | 2/2003 | Herle | H04L 63/0428 380/270 |
| 2007/0132636 A1 | 6/2007 | Young et al. | |
| 2008/0291086 A1* | 11/2008 | Walley | G01S 5/0263 342/367 |
| 2009/0177399 A1* | 7/2009 | Park | G01S 19/48 701/300 |
| 2011/0291884 A1* | 12/2011 | Oh | G01S 19/48 342/357.31 |
| 2012/0053889 A1* | 3/2012 | Sambongi | G03F 7/70775 702/150 |
| 2012/0249372 A1* | 10/2012 | Jovicic | G01S 1/042 342/451 |
| 2014/0244165 A1* | 8/2014 | Bells | G01C 21/367 701/455 |
| 2014/0278220 A1* | 9/2014 | Yuen | G01B 21/16 702/150 |

OTHER PUBLICATIONS

International Search Report and Written Opinion for PCT/US2015/047995, dated Nov. 27, 2015, Apple Inc.

Paek, J., et al., "Energy-Efficient Rate-Adaptive GPS-based Positioning for Smartphones," Proceedings of the 8th International Conference on Mobile systems, applications and services, Month Unknown 2010, pp. 299-314, ACM, New York, USA.

Vukadinovic, V., et al., "Performance of Collaborative GPS Localization in Pedestrian Ad Hoc Networks," Proceedings of the third ACM International Workshop on Mobile Opportunistic Networks, Month Unknown 2012, pp. 45-52, ACM, New York, USA.

* cited by examiner

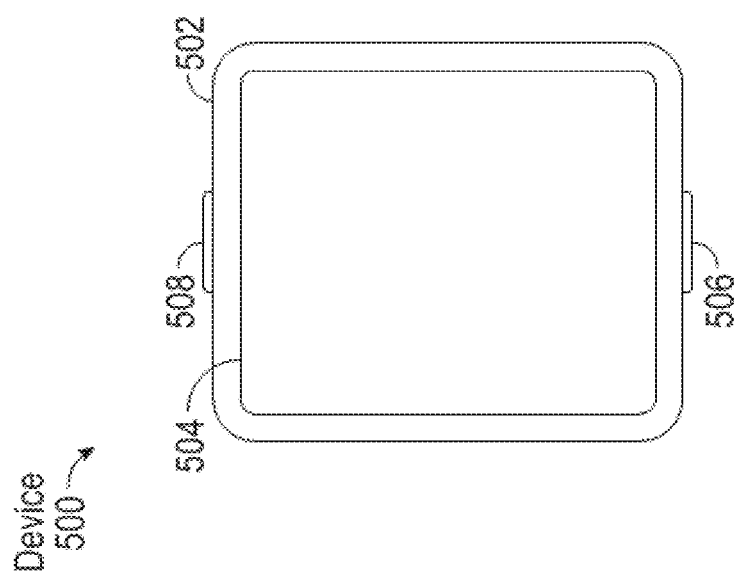

LOCATION DETERMINATION USING COMMUNICATIVELY COUPLED ELECTRONIC DEVICES

BACKGROUND

1. Field

The present disclosure relates generally to location determination using electronic devices and, more specifically, to selecting location data provided by communicatively coupled electronic devices.

2. Description of Related Art

With the increased popularity of mobile electronic devices, it is not uncommon for a user to carry more than one of these devices. For example, a user can have both a mobile phone and a wearable electronic device, such as a watch. Many of these devices are capable of determining their location using various technologies. While a device's location can be used to improve the performance of applications running on the device, such as mapping and navigation, weather, Internet browsing, recommendation, and other applications, current mobile electronic devices fail to efficiently operate with one another and are either limited to using location data generated by their own sensors or rely solely on location data generated by another device. Accordingly, there is a need for improved processes for interacting between electronic devices.

BRIEF SUMMARY

The present disclosure relates to systems and processes for selecting location data provided by communicatively coupled electronic devices. In one example process, a first electronic device can select one of a first location determined by the first electronic device and a second location determined by a second electronic device for use as the location of the first electronic device. The selection can be made based on one or more of the times the first and second locations were determined, accuracies of the first and second location determinations, whether or not the first and second locations intersect, priorities associated with source used to determine the first and second locations, and previous location determinations made by the first electronic device. The selected location can be used as the location of the first electronic device to execute an application on the first electronic device.

DESCRIPTION OF THE FIGURES

FIG. 5A is a block diagram illustrating a portable multifunction device with a touch-sensitive display in accordance with some examples.

DETAILED DESCRIPTION

The following description sets forth exemplary methods, parameters and the like. It should be recognized, however, that such description is not intended as a limitation on the scope of the present disclosure but is instead provided as a description of exemplary embodiments.

The present disclosure relates to systems and processes for selecting location data provided by communicatively coupled electronic devices. In one example process, a first electronic device can select one of a first location determined by the first electronic device and a second location determined by a second electronic device for use as the location of the first electronic device. The selection can be made based on one or more of the times the first and second locations were determined, accuracies of the first and second location determinations, whether or not the first and second locations intersect, priorities associated with source used to determine the first and second locations, and previous location determinations made by the first electronic device. The selected location can be used as the location of the first electronic device to execute an application on the first electronic device.

Figure 2:
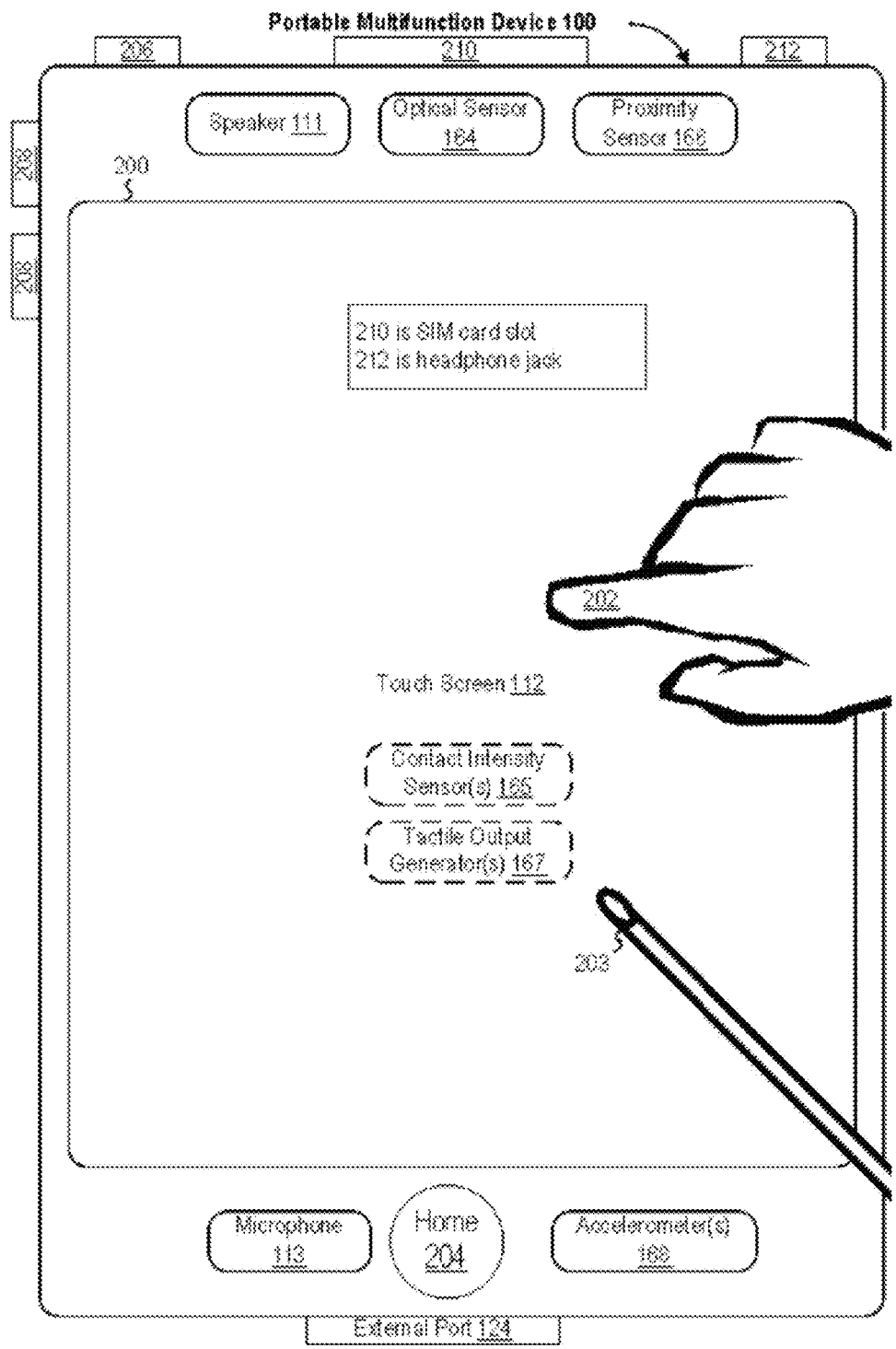
FIG. 2 illustrates a portable multifunction device having a touch-sensitive display in accordance with some examples.
Figure 3:
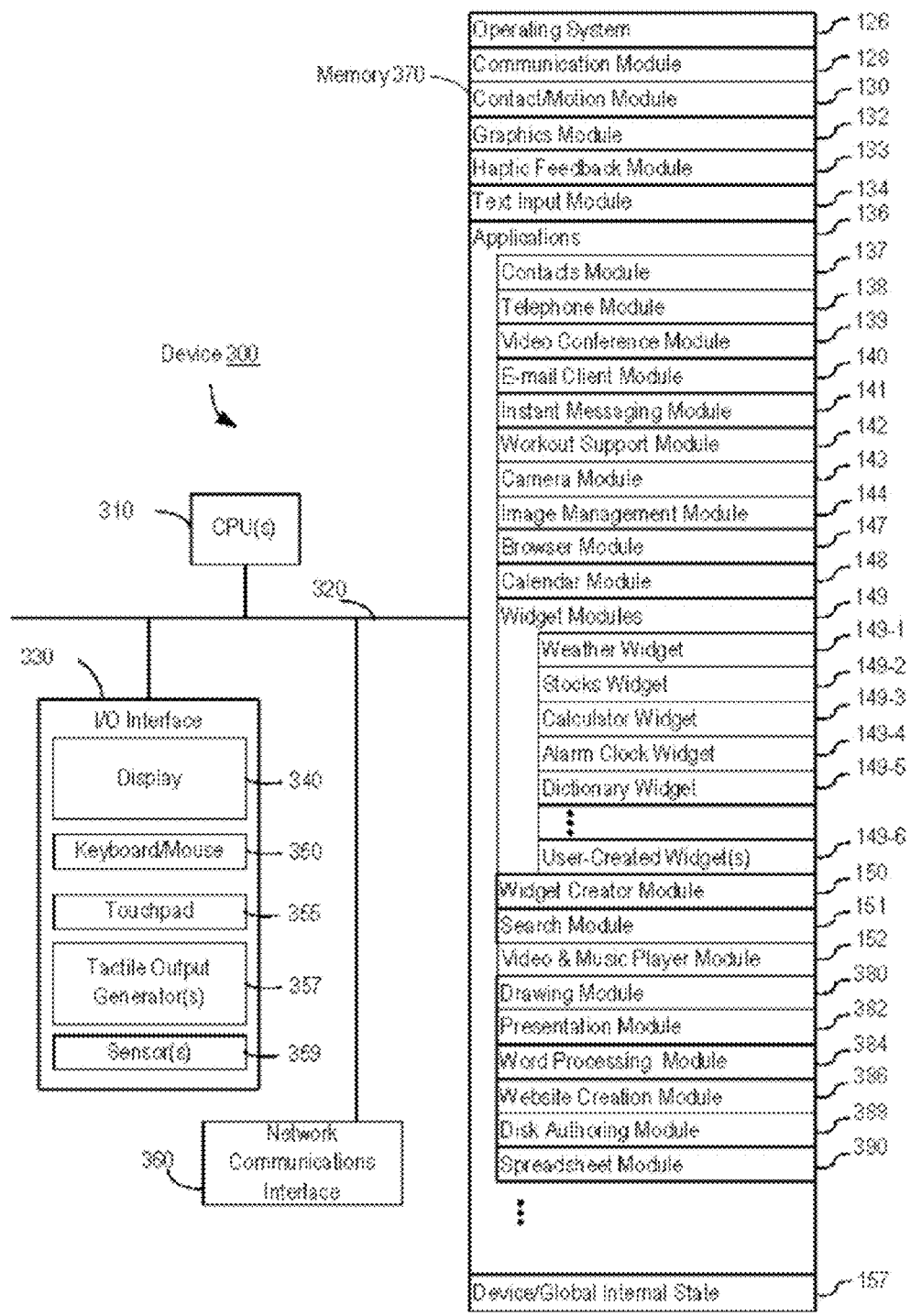
FIG. 3 is a block diagram of an exemplary multifunction device with a display and a touch-sensitive surface in accordance with some examples.
Figure 4A:
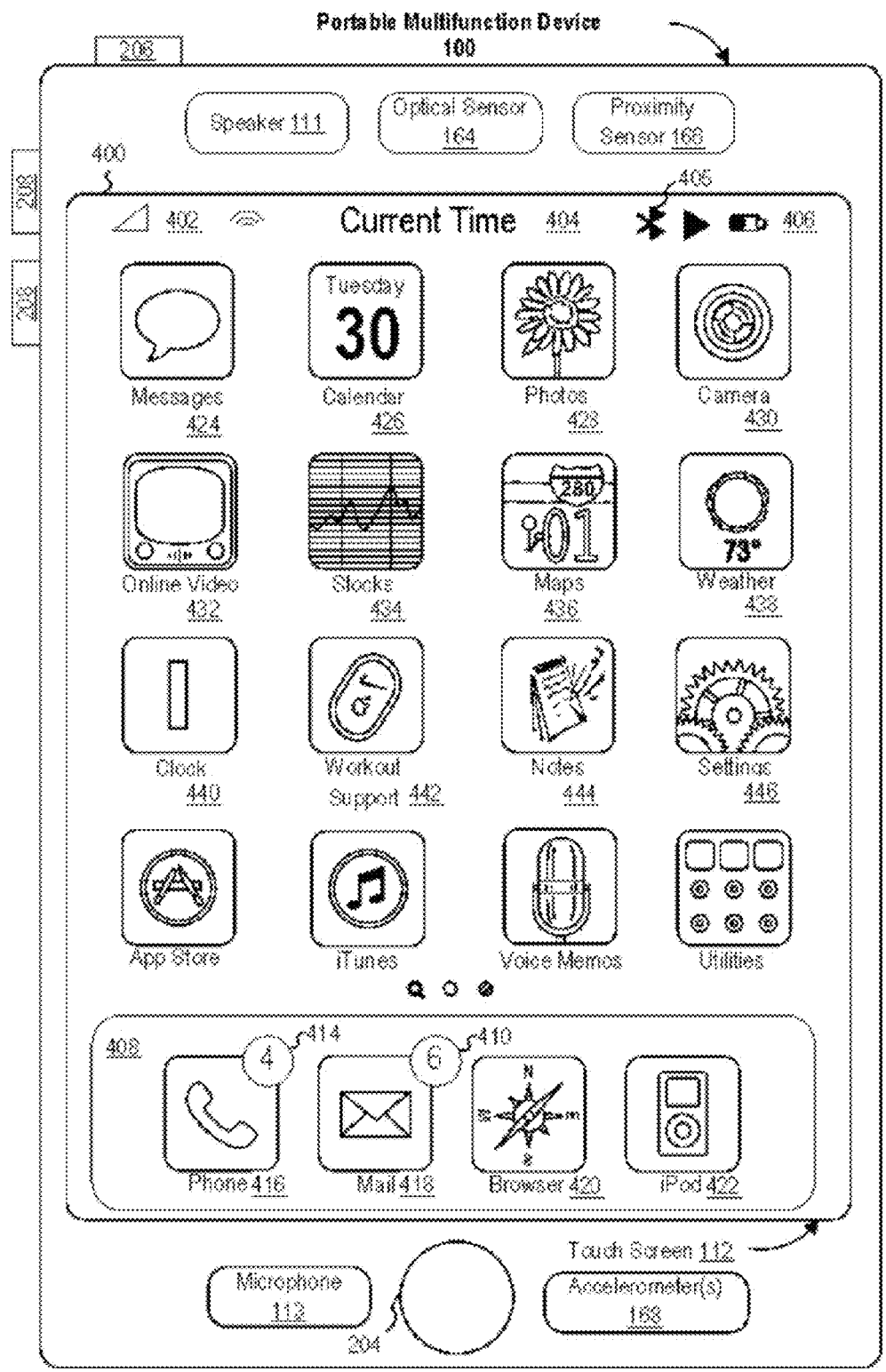
FIGS. 4A and 4B illustrate an exemplary user interface for a menu of applications on a portable multifunction device in accordance with some examples.
Figure 4B:
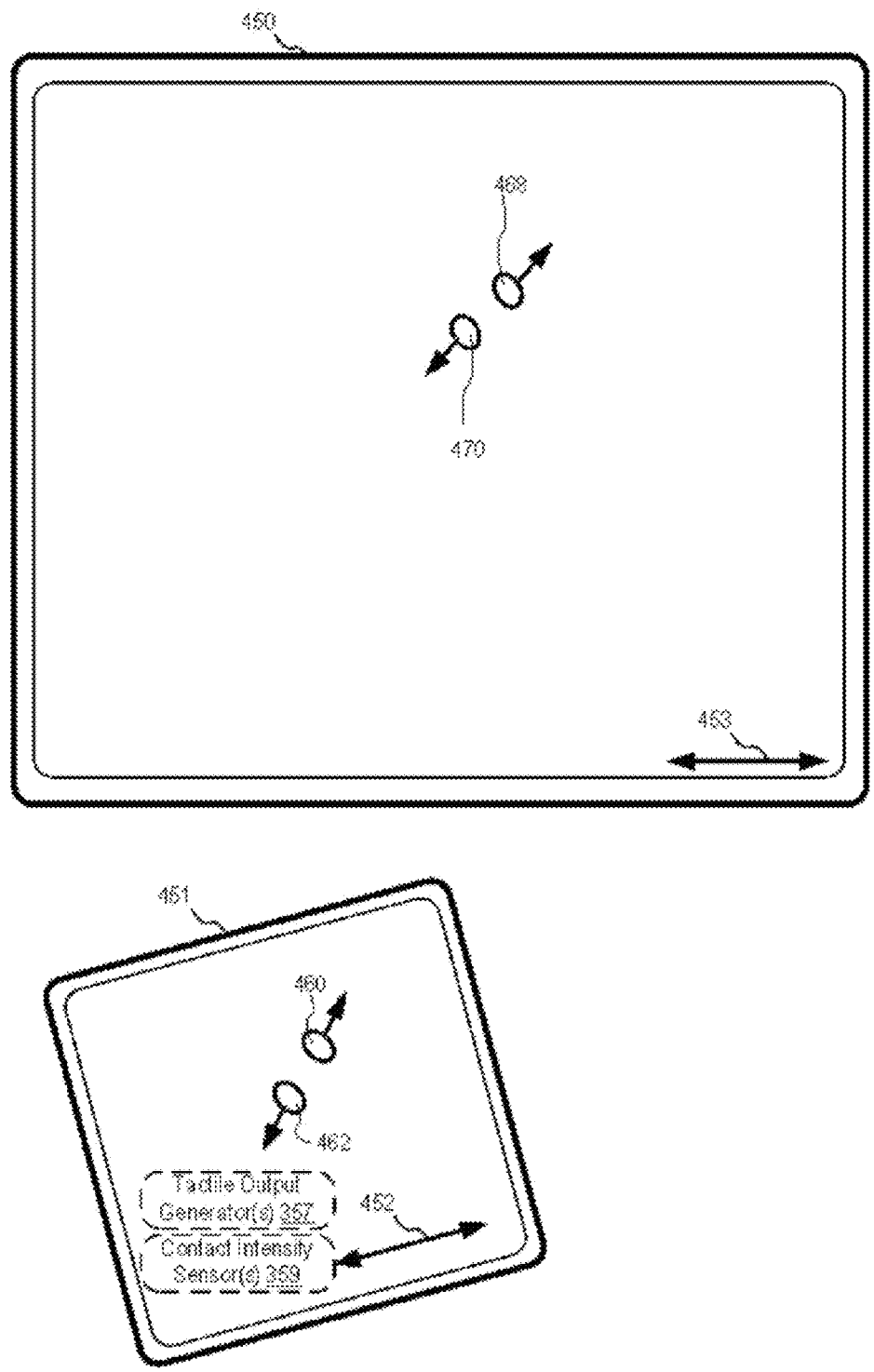

Below, FIGS. 1A-1B, 2, 3, and 5A-5B provide a description of exemplary devices for performing the techniques for selecting location data provided by communicatively coupled electronic devices. FIGS. 4A-4B illustrate exemplary user interfaces that can be displayed on these exemplary devices.

Although the following description uses terms first, second, etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting", depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]", depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
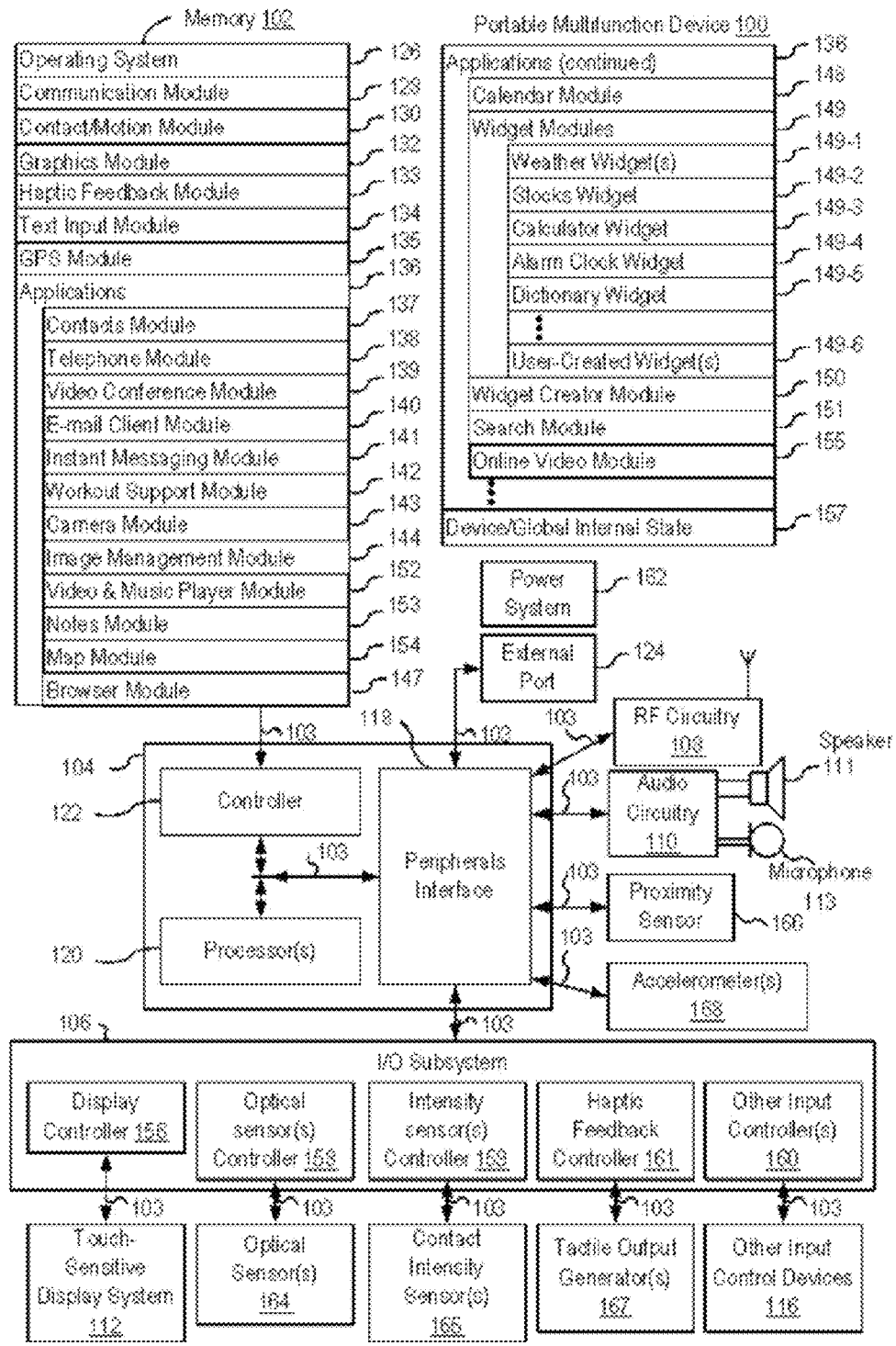
FIG. 1A is a block diagram illustrating a portable multifunction device with a touch-sensitive display in accordance with some examples.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click", a "down click", "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer readable storage mediums. The computer readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image", filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web-pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller", filed May 2, 2006, now issued as U.S. Pat. No. 8,279,180; (2) U.S. patent application Ser. No. 10/840,862, "Multipoint Touchscreen", filed May 6, 2004, now issued as U.S. Pat. No. 7,663,607; (3) U.S. patent application Ser. No. 10/903,964, "Gestures For Touch Sensitive Input Devices", filed Jul. 30, 2004, now issued as U.S. Pat. No. 8,479,122; (4) U.S. patent application Ser. No. 11/048,264, "Gestures For Touch Sensitive Input Devices", filed Jan. 31, 2005, now published as U.S. Patent Publication 2006/0026536; (5) U.S. patent application Ser. No. 11/038,590, "Mode-Based Graphical User Interfaces For Touch Sensitive Input Devices", filed Jan. 18, 2005, now issued as U.S. Pat. No. 8,239,784; (6) U.S. patent application Ser. No. 11/228,758, "Virtual Input Device Placement On A Touch Screen User Interface", filed Sep. 16, 2005, now published as U.S. Patent Publication 2006/0033724; (7) U.S. patent application Ser. No. 11/228,700, "Operation Of A Computer With A Touch Screen Interface", filed Sep. 16, 2005, now issued as U.S. Pat. No. 7,614,008; (8) U.S. patent application Ser. No. 11/228,737, "Activating Virtual Keys Of A Touch-Screen Virtual Keyboard", filed Sep. 16, 2005, now issued as U.S. Pat. No. 7,844,914; and (9) U.S. patent application Ser. No. 11/367,749, "Multi-Functional Hand-Held Device", filed Mar. 3, 2006, now published as U.S. Patent Publication 2006/0197753. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
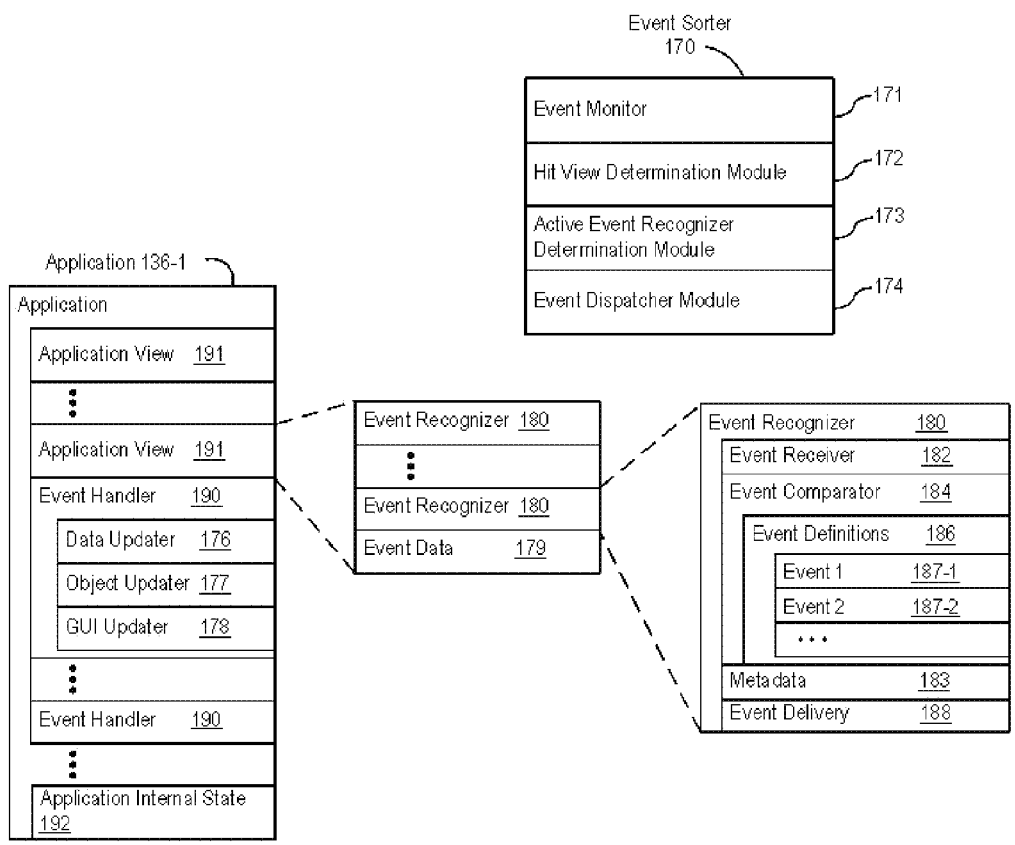
FIG. 1B is a block diagram illustrating exemplary components for event handling in accordance with some examples.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device", now issued as U.S. Pat. No. 7,653,883; Ser. No. 11/240,788, "Proximity Detector In Handheld Device", now issued as U.S. Pat. No. 8,381,135; Ser. No. 11/620,702, "Using Ambient Light Sensor To Augment Proximity Sensor Output", now issued as U.S. Pat. No. 7,957,762; Ser. No. 11/586,862, "Automated Response To And Sensing Of User Activity In Portable Devices", now issued as U.S. Pat. No. 7,633,076; and Ser. No. 11/638,251, "Methods And Systems For Automatic Configuration Of Peripherals", now issued as U.S. Pat. No. 8,006,002, which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices", and U.S. Patent Publication No. 20060017692, "Methods And Apparatuses For Operating A Portable Device Based On An Accelerometer", both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web-pages or portions thereof, as well as attachments and other files linked to web-pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web-page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos", filed Jun. 20, 2007, and U.S. patent application Ser. No. 11/968,067, "Portable Multifunction Device, Method, and Graphical User Interface for Playing Online Videos", filed Dec. 31, 2007, now published as U.S. Patent Publication 2008/0320391, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU'S) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 may be stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone", which optionally includes an indicator 414 of the number of missed calls or voicemail messages;
  Icon 418 for e-mail client module 140, labeled "Mail", which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icons 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touchscreen 504. Alternatively, or in addition to touchscreen 504, device 500 has a display and a touch-sensitive surface. As with devices 100 and 300, in some embodiments, touchscreen 504 (or the touch-sensitive surface) may have one or more intensity sensors for detecting intensity of contacts (e.g., touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500. As used here, the term "intensity" of a contact (or touch) on touchscreen 504 (or the touch-sensitive surface) refers to the force or pressure (force per unit area) of a touch (e.g., a finger) on the touchscreen.

Techniques for detecting and processing touch intensity may be found, for example, in related applications: International Patent Application Serial No. PCT/US2013/040061, entitled "Device, Method, and Graphical User Interface for Displaying User Interface Objects Corresponding to an Application", filed May 8, 2013 and International Patent Application Serial No. PCT/US2013/069483, entitled "Device, Method, and Graphical User Interface for Transitioning Between Touch Input to Display Output Relationships", filed Nov. 11, 2013.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
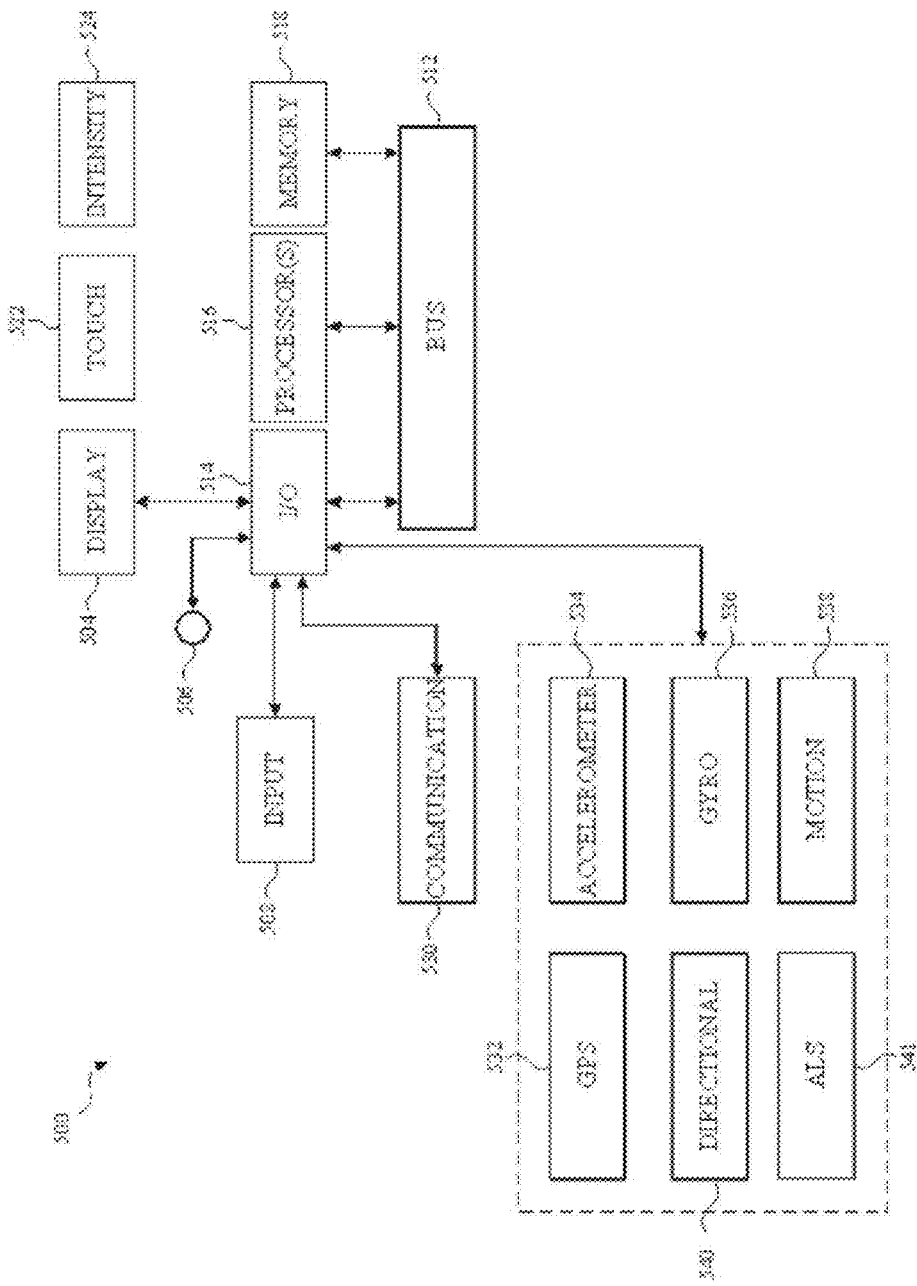
FIG. 5B illustrates a portable multifunction device having a touch-sensitive display in accordance with some examples.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth", near field communication ("NFC"), cellular and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Computing device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of computing device 500 can be a non-transitory computer readable storage medium, for storing computer-executable instructions, which, when executed by one or more computer processors 516, for example, can cause the computer processors to perform the techniques described above, including processes 700 and 800 (FIGS. 7-8). The computer-executable instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer readable storage medium" can be any medium that can tangibly contain or store computer-executable instructions for use by or in connection with the instruction execution system, apparatus, or device. The non-transitory computer readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Computing device 500 is not limited to the components and configuration of FIG. 5B, but can include other or additional components in multiple configurations.

As used here, the term "affordance" refers to a user-interactive graphical user interface object that may be displayed on the display screen of device 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector", so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector", so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the third threshold results in a third operation. In some embodiments, a comparison between the characteristic intensity and one or more thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm may be an unweighted sliding-average smoothing algorithm, a triangular smoothing algorithm, a median filter smoothing algorithm, and/or an exponential smoothing algorithm. These smoothing algorithms may eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments the contact-detection intensity threshold is zero. In some embodiments the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter", where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the term "open application" or "executing application" refers to a software application with retained state information (e.g., as part of device/global internal state 157 and/or application internal state 192). An open or executing application may be any one of the following types of applications:
- an active application, which is currently displayed on a display screen of the device that the application is being used on;
- a background application (or background processes) which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 6:
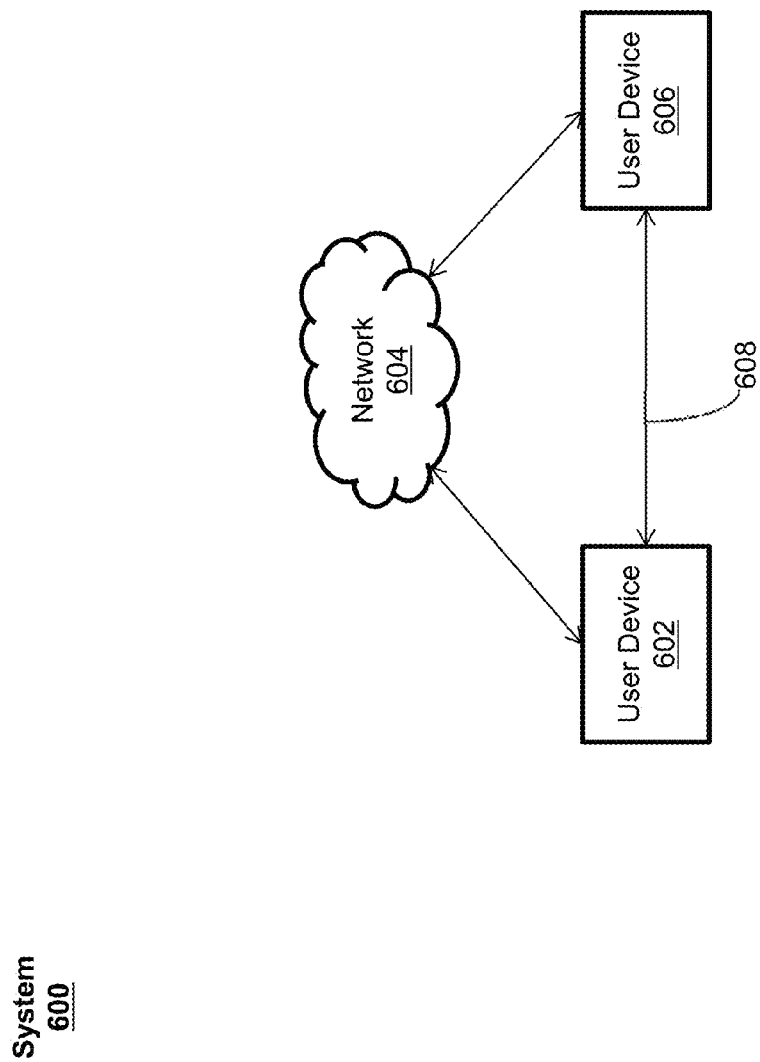
FIG. 6 illustrates a block diagram of an exemplary system for selecting location data provided by communicatively coupled electronic devices according to various examples.

FIG. 6 illustrates an exemplary system 600 for selecting location data provided by communicatively coupled electronic devices according to various examples. System 600 can include a first user device 602 and a second user device 604, which can each include any type of electronic device that is capable of determining its location using one or more location determining technologies (e.g., GPS, GLONASS, Wi-Fi, cellular, etc.), such as device 100, 300, or 500. In some examples, first user device 602 and second user device 604 can be configured to determine their respective locations in response to a request by a user, in response to a request by an application running on the device, or periodically, intermittently, or at any other desired frequency or interval of time. First user device 602 and/or second user device 604 can be further configured to transmit some or all of their location determinations to the other user device. This can be done in response to a request by the other device, in response to generating the location determination, or periodically, intermittently, or at any other desired frequency or interval of time. The determined locations can be transmitted between the devices via a direct communication connection 608 (e.g., Bluetooth, NFC, BTLE, or the like) or via network 604, which can include the Internet, a local Wi-Fi network, or any other wired or wireless public or private network. While only two user devices 602 and 604 are shown in FIG. 6, it should be appreciated that system 600 can include any number and type of user devices.

As described in greater detail below with respect to FIGS. 7 and 8, system 600 can advantageously be used to improve the location determination services provided by each user device by allowing the devices to selectively use a location determined by either device. This can be particularly beneficial when one user device has limited location determination capabilities and/or limited battery power, such as a watch or other compact electronic device. In these situations, the user device can either use its own location determinations or can use location determinations made by another nearby electronic device that may be capable of producing better location results and/or may have more battery power to operate its location determination circuitry, such as a mobile phone, tablet computer, or the like.

Figure 7:
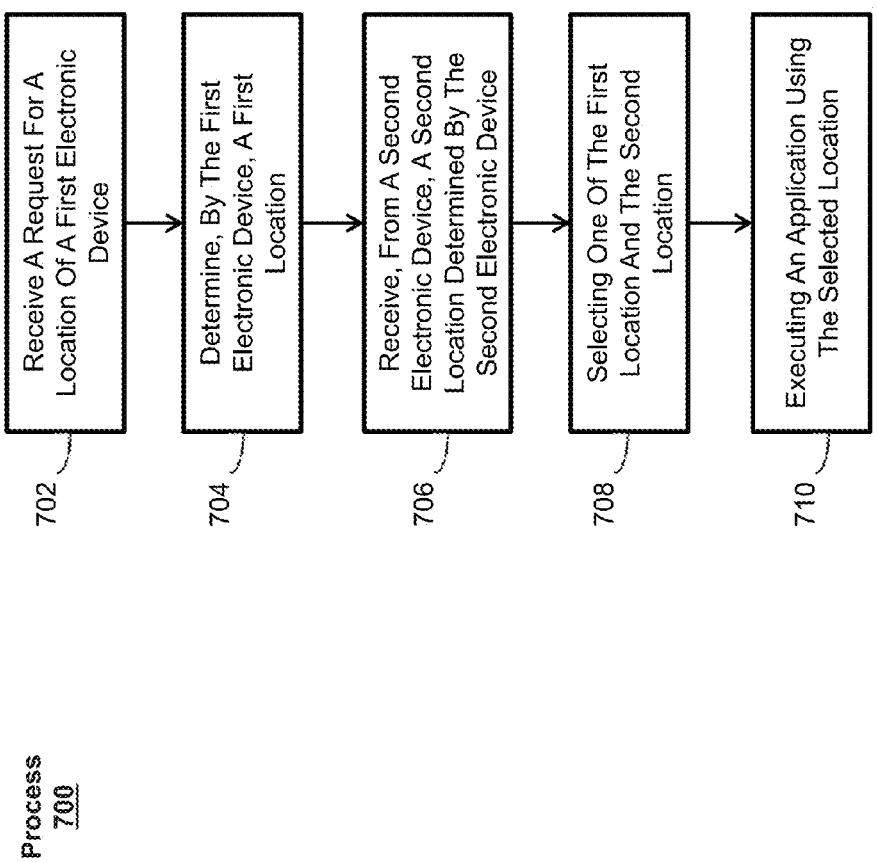
FIG. 7 illustrates an exemplary process for selecting location data provided by communicatively coupled electronic devices according to various examples.

FIG. 7 illustrates an exemplary process 700 for selecting location data provided by communicatively coupled electronic devices according to various examples. In some examples, process 700 can be performed using an electronic device similar or identical to device 100, 300, 500, 602, or 604.

At block 702, one or more processors (e.g., processors 120, CPU(s) 310, or processor(s) 516) of a first electronic device can receive a request for a location of the first electronic device. In some examples, the request can originate from a process or software application running on the first electronic device, such as a mapping and navigation application, Internet browser, weather application, or any other application needing location information of the electronic device.

At block 704, one or more processors of the first electronic device can determine a first location of the device using any desired location determination technology, such as GPS or GLONASS (e.g., using GPS module 135, sensors 359, or GPS sensor 532), Wi-Fi or cellular (e.g., using RF circuitry 108, network communication interface 360, or communication unit 530), or the like. For example, the first electronic device can receive location information from GPS satellites, nearby Wi-Fi base stations, and/or nearby cell towers, as described in U.S. patent application Ser. No. 12/040,283, "Location Determination", filed Feb. 29, 2008, now published as U.S. Patent Publication 2009/0219209; 12/103,330, "Location Determination Using Formula", filed Apr. 15, 2008, now published as U.S. Patent Publication 2009/0258660; and Ser. No. 12/122,339, "Location Determination", filed May 16, 2008, now published as U.S. Patent Publication 2009/0286549, each of which is incorporated by reference herein in their entirety for all purposes. The first electronic device can store the determined first location in a memory on the first electronic device along with associated metadata, such as a time that the first location was determined, an accuracy or margin of error of the determined first location, source of data used to determine the location (e.g., GPS, GLONASS, Wi-Fi, cellular, etc.), and the like. In some examples, the memory can further store one or more previous locations determined by the first electronic device and their associated metadata.

At block 706, the first electronic device can receive, from a second electronic device, a second location determined by the second electronic device. In some examples, the first electronic device can further receive metadata associated with the determined second location, such as a time that the second location was determined, an accuracy or margin of error of the determined second location, a source of the data used to determine the second location (e.g., GPS, GLONASS, Wi-Fi, cellular, etc.), and the like. The first electronic device can receive the second location via any direct (e.g., direct communication connection 608) or indirect (e.g., via network 604) communication connection (e.g., using RF circuitry 108, network communication interface 360, or communication unit 530). In some examples, the second location can be transmitted by the second electronic device to the first electronic device in response to a request from the first electronic device. For example, an application running on the first electronic device needing a location of the user can cause the first electronic device to transmit a request to the second electronic device for a location. In response, the second electronic device can transmit the second location to the first electronic device. In other examples, the second electronic device can transmit updated locations determined by the second electronic device periodically, intermittently, or at any other desired frequency or interval of time. For example, the second user device can be configured to periodically, intermittently, or at any other desired frequency or interval of time determine an updated location of the second electronic device and can transmit the updated locations to the first electronic device at the same or a different frequency or interval of time. The first electronic device can store the received second location in a memory on the first electronic device along with the associated metadata. In some examples, the memory can further store one or more previous locations determined by the second electronic device and their associated metadata.

At block 708, the one or more processors of the first electronic device can select one of the first location determined by the first electronic device or the second location determined by the second electronic device to be used as the location of the first electronic device. The one or more processors of the first electronic device can select between the first location and the second location in numerous ways, but can generally include determining which location is more likely to accurately represent the location of the first electronic device. In some examples, a process similar to process 800, shown in FIG. 8, can be performed by the first electronic device to select one of the first and second locations.

At block 802 of process 800, it can be determined whether a time that the first location was determined ($T_{LOC1}$) minus a time that the second location was determined ($T_{LOC2}$) is greater than or equal to a predetermined threshold duration ($T_{THRESHOLD}$). In other words, it can be determined whether the second location is older than the first location by more than the predetermined threshold duration. The metadata associated with the first and second locations stored in the memory of the first electronic device can be used to determine the time that the first and second locations were determined. In some examples, the predetermined threshold duration can be 60 seconds. However, it should be appreciated that the predetermined threshold duration can have any desired value. If it is determined that the time that the first location was determined ($T_{LOC1}$) minus the time that the second location was determined ($T_{LOC2}$) is greater than or equal to the predetermined threshold duration ($T_{THRESHOLD}$), process 800 can proceed to block 814 where the first location can be selected. Alternatively, if it is determined that the time that the first location was determined ($T_{LOC1}$) minus the time that the second location was determined ($T_{LOC2}$) is not greater than or equal to the predetermined threshold duration ($T_{THRESHOLD}$), process 800 can proceed to block 804.

At block 804, it can be determined whether an accuracy of the determined first location ($Accuracy_{LOC1}$) is greater than the accuracy of the determined second location ($Accuracy_{LOC2}$). The accuracies of the location measurements can be determined by the first and second electronic devices at the time the measurements are generated and can be based on tolerances of the equipment used to determine the location, conditions during which the measurements were taken, received signal quality (e.g., GPS, GLONASS, Wi-Fi, cellular, or the like), other factors that affect the confidence that the determined locations are correct, or the like. If it is determined that the accuracy of the determined first location ($Accuracy_{LOC1}$) is greater than the accuracy of the determined second location ($Accuracy_{LOC2}$), process 800 can proceed to block 814 where the first location can be selected. Alternatively, if it is instead determined that the accuracy of the determined first location ($Accuracy_{LOC1}$) is not greater than the accuracy of the determined second location ($Accuracy_{LOC2}$), process 800 can proceed to block 806.

At block 806, it can be determined whether a first area within a first error threshold distance from the first location (LOC1) intersects a second area within a second error threshold distance from the second location (LOC2). The first error threshold can represent an error tolerance or accuracy of the determined first location and the second error threshold can represent and error tolerance or accuracy of the determined second location. The first and second error thresholds can be the same or different. For example, the first error threshold can be 5 meters, while the second error threshold can be 10 meters. In this example, block 806 can include determining whether the area within 5 meters from the first location intersects with the area within 10 meters of the second location. If it is determined that the first area does not intersect at least a portion of the second area, process 800 can proceed to block 814 where the first location can be selected. This condition can represent the situation in which the first electronic device is located a distance away from the second electronic device (e.g., the devices are on opposite sides of the user's house). In this situation, the location of the first electronic device can be preferable since it can be more likely to accurately represent the location of the first electronic device. Alternatively, if it is instead determined that the first area intersects at least a portion of the second area, process 800 can proceed to block 808. In this situation, the devices are likely close together and the second location can likely be an accurate representation of the first electronic device's actual location.

At block 808, it can be determined whether a priority of a first source of the first location ($Priority_{LOC1}$) is greater than a priority of a second source of the second location ($Priority_{LOC2}$). The priorities can represent a relative preference between possible sources of the determined locations that can be predetermined and/or user-defined. For example, the sources of the first and second locations can include GPS, GLONASS, Wi-Fi, cellular, or the like. In some examples, Wi-Fi can be given the highest priority, GPS can be given the next highest priority, GLONASS can be given the next highest priority, and cellular can be given the lowest priority. However, it should be appreciated that the sources can be given any desired priority. If it is determined that the priority of the first source of the first location ($Priority_{LOC1}$) is greater than the priority of the second source of the second location ($Priority_{LOC2}$), process 800 can proceed to block 814 where the first location can be selected. Alternatively, if it is instead determined that the first source of the first location ($Priority_{LOC1}$) is not greater than the priority of the second source of the second location ($Priority_{LOC2}$), process 800 can proceed to block 810.

At block 810, it can be determined whether a predetermined number of previous locations determined by the first electronic device were incorrect by more than a threshold distance and/or had error tolerances greater than a threshold amount. This can be performed to determine if the most recent location determined by the first electronic device (the first location) is likely to be incorrect based on a history of incorrect measurements. The predetermined number of previous locations, the threshold distance, and the error tolerances can be selected to be any desired value depending on the desired confidence level that the determined first location is correct or within a desired distance from the actual location of the first electronic device. If it is determined that the predetermined number of previous locations determined by the first electronic device were not incorrect by more than a threshold distance and/or did not have error tolerances greater than a threshold amount, process 800 can proceed to block 814 where the first location can be selected. Alternatively, if it is instead determined that the predetermined number of previous locations determined by the first electronic device were incorrect by more than a threshold distance and/or had error tolerances greater than a threshold amount, process 800 can proceed to block 812 where the second location can be selected.

Figure 8:
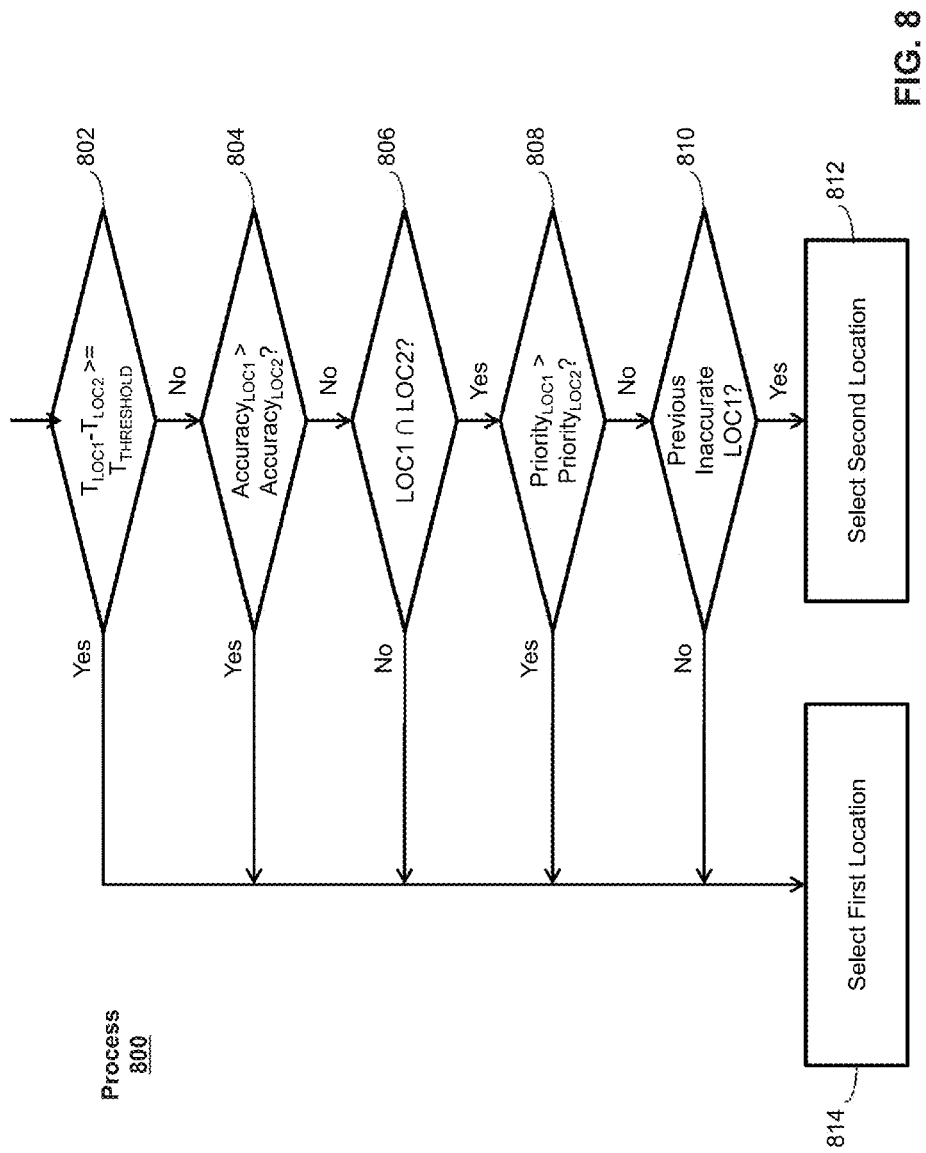
FIG. 8 illustrates another exemplary process for selecting location data provided by communicatively coupled electronic devices according to various examples.

While FIG. 8 shows blocks 802, 804, 806, 808, and 810 as being performed in a particular order, it should be appreciated that these blocks can be performed in any order and that some blocks need not be performed. For instance, in some examples, process 800 can include only one of blocks 802, 804, 806, 808, and 810, and the first or second location can be selected based solely on the criteria associated with that block. In other examples, 2, 3, 4, or 5 of blocks 802, 804, 806, 808, and 810 can be included in process 800 and can be performed in any order or at the same time. In these examples, if a determination at one of blocks 802, 804, 806, 808, and 810 does not result in process 800 proceeding to block 814, the process can proceed to the next block of blocks 802, 804, 806, 808, and 810, unless the current block is the last block in which case process 800 can proceed to block 812.

In some examples, rather than select either the first location or the second location using a rule-based system like that shown in FIG. 8, a probabilistic system can be used. In these examples, criteria similar or identical to those associated with blocks 802, 804, 806, 808, and 810 can be evaluated and used to increase or decrease the likelihood that the first (or second) location should be selected. For example, conditions causing process 800 to proceed to block 814 can increase the probability that the first location should be selected, while conditions causing process 800 to proceed to block 804, 806, 808, 810, or 812 can decreases the probability that the first location should be selected and/or increase the probability that the second location should be selected. The amount that each criteria causes the probabilities to be increased or decreased can be selected to be any desired predetermined or adjustable value. In some examples, the amount that each criteria causes the probabilities to be increased or decreased can be the same for each criteria or can be different for some or all of the different criteria. In other examples, the amount that each criteria causes the probabilities to be increased or decreased can depend on the values of the criteria being evaluated. For example, the amount that the likelihood that the first location should be selected is increased can be greater for larger values of ($T_{LOC1}$-$T_{LOC2}$) at block 802, can be greater for larger positive differences between $Accuracy_{LOC1}$ and $Accuracy_{LOC2}$ at block 804, and can be greater for larger positive differences between $Priority_{LOC1}$ and $Priority_{LOC2}$ at block 808. Similarly, the amount that the likelihood that the first location should be selected is decreased can be greater for larger amounts of intersection between LOC1 and LOC2 at block 806, and can also be greater for a larger number of previous inaccurate measurements made by the first electronic device at block 810. Similar to the rule-based system shown in FIG. 8, it should be appreciated that the probabilistic system can evaluate any number of the criteria described above and can do so in any order.

Referring back to FIG. 7, after selecting either the first location or the second location at block 708, process 700 can proceed to block 710. At block 710, the first electronic device can execute an application using the location selected at block 708 as the location of the first electronic device. The application can include any type of application, such as a mapping and navigation, weather, Internet browsing, recommendation, and other applications. For example, if the application is a mapping and navigation application, the first electronic device can display a map of the mapping and navigation application and use the selected location to perform some function of the mapping and navigation application (e.g., to display a current location icon representing the user's position overlaid on the map). In another example, if the application includes an Internet browsing application, the first electronic device can receive an Internet search query from the user and perform the search query using the selected location to filter the search results or can transmit the search query and the selected location to a server that performs the search query.

While FIG. 7 shows blocks 702, 704, 706, 708, and 710 as being performed in a particular order, it should be appreciated that these blocks can be performed in any order and that some blocks need not be performed. For example, block 704 and/or block 706 can be performed before block 702, after block 702, in response to performing block 702, or may not be performed at all. In examples where only one of blocks 704 and 706 is performed (e.g., only one of the first location and the second location is available), the single available location can be selected for use at block 708.

Using processes 700 and 800, communicatively coupled electronic devices can advantageously select between locations determined by each device to provide the user with location information that can be more accurate than possible when using the devices individually. This can be particularly beneficial for an electronic device having limited location determination capabilities and/or battery power, such as a watch or other compact electronic device. In these situations, the electronic device can selectively use a location determined by an associated electronic device that can have more sophisticated location determination capabilities and/or more battery power to operate its location determination circuitry.

Figure 9:
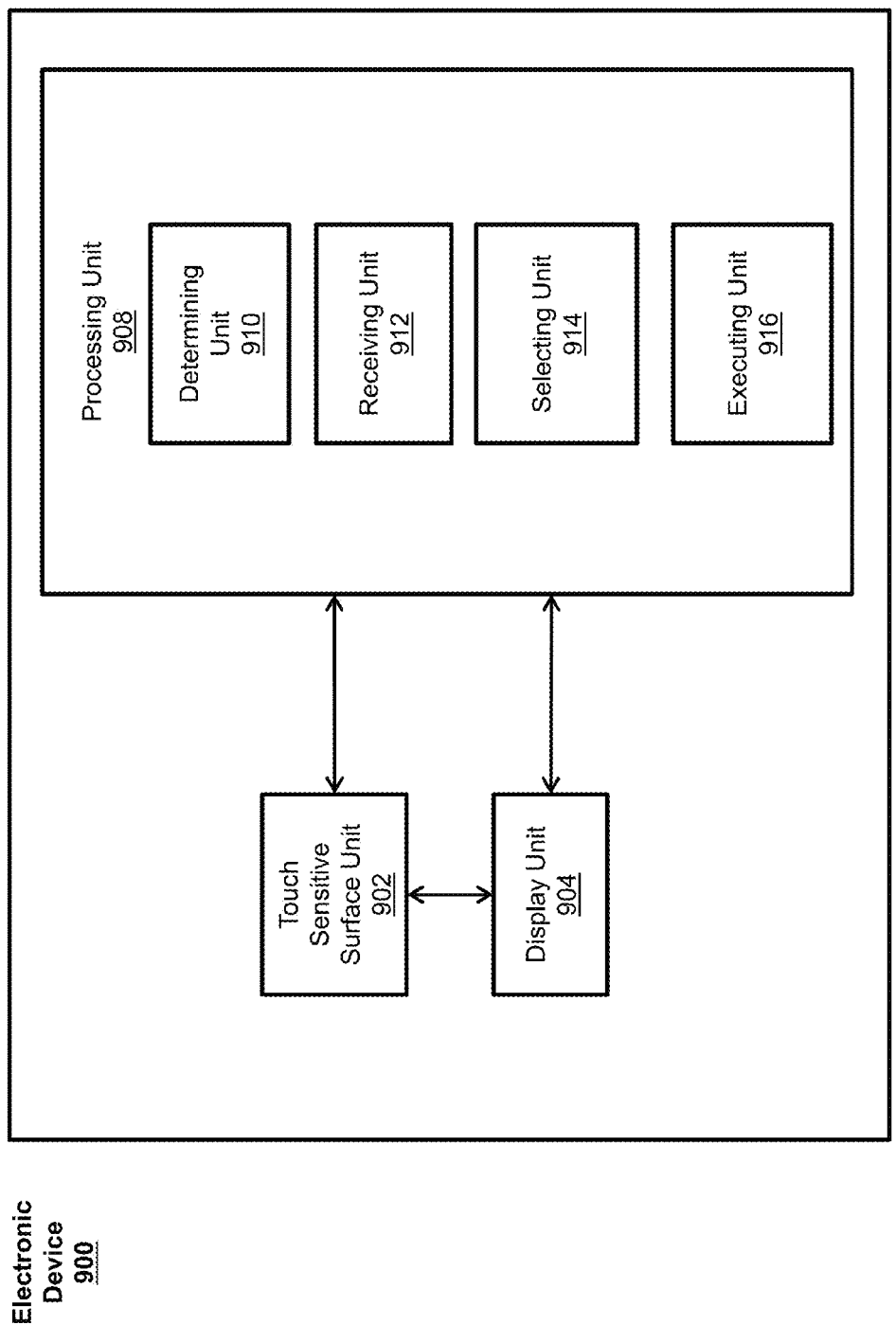
FIG. 9 is a functional block diagram of an electronic device in accordance with some examples.

FIG. 9 shows a functional block diagram of an electronic device 900 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 9 can be combined or separated into sub-blocks to implement the principles of the various described examples. Therefore, the description herein optionally supports any possible combination or separation or further definition of the functional blocks described herein.

As shown in FIG. 9, electronic device 900 can include a display unit 904 configured to display graphical objects, a touch-sensitive surface unit 902 configured to receive user gestures, and a processing unit 908. In some examples, processing unit 908 can include a determining unit 910, a receiving unit 912, a selecting unit 914, and executing unit 916.

Processing unit 908 can be configured to determine (e.g., using determining unit 910) a first location using one or more sensors of the first electronic device. Receiving unit 912 can receive a second location determined by the second electronic device. Selecting unit 914 can select one of the first location and the second location. Executing unit 916 can execute an application using the selected location as a location of the first electronic device.

In some examples, selecting unit 914 can be configured to select one of the first location and the second location by determining whether a time that the first location was determined is later than a time that the second location was determined by more than a predetermined length of time and, in accordance with a determination that the time that the first location was determined is later than the time that the second location was determined by more than the predetermined length of time, selecting the first location determined by the first electronic device.

In some examples, selecting unit 914 can be configured to select one of the first location and the second location by determining whether an accuracy of the first location is greater than an accuracy of the second location and, in accordance with a determination that the accuracy of the first location is greater than the accuracy of the second location, selecting the first location determined by the first electronic device.

In some examples, selecting unit 914 can be configured to select one of the first location and the second location by determining whether a first area within a first error threshold from the first location intersects a second area within a second error threshold from the second location and, in accordance with a determination that the first area within the first error threshold from the first location intersects the second area within the second error threshold from the second location, selecting the first location determined by the first electronic device.

In some examples, selecting unit 914 can be configured to select one of the first location and the second location by determining whether a first priority of a first source of the first location is greater than a second priority of a second source of the second location and, in accordance with a determination that the first priority of the source of the first location is greater than the priority of the source of the second location, selecting the first location determined by the first electronic device.

In some examples, selecting unit 914 can be configured to select one of the first location and the second location by determining whether one or more previous locations determined by the first electronic device were incorrect by more than a threshold distance and, in accordance with a determination that the one or more previous locations determined by the first electronic device were not incorrect by more than the threshold distance, selecting the first location determined by the first electronic device.

In some examples, selecting unit 914 can be configured to select the second location determined by the second electronic device in accordance with a determination that the time that the first location was determined is not later than the time that the second location was determined by more than the predetermined length of time.

In some examples, selecting unit 914 can be configured to select the second location determined by the second electronic device in accordance with a determination the accuracy of the first location is not greater than the accuracy of the second location.

In some examples, selecting unit 914 can be configured to select the second location determined by the second electronic device in accordance with a determination that the first area within the first error threshold from the first location does not intersect the second area within the second error threshold from the second location.

In some examples, selecting unit 914 can be configured to select the second location determined by the second electronic device in accordance with a determination that the first priority of the source of the first location is not greater than the priority of the source of the second location.

In some examples, selecting unit 914 can be configured to select the second location determined by the second electronic device in accordance with a determination that the one or more previous locations determined by the first electronic device were incorrect by more than the threshold distance.

In some examples, receiving unit 912 can be configured to receive one or more Wi-Fi signals. In these examples, determining unit 910 can be configured to determine the first location based at least in part on the received one or more Wi-Fi signals.

In some examples, receiving unit 912 can be configured to receive one or more cellular signals. In these examples, determining unit 910 can be configured to determine the first location based at least in part on the received one or more cellular signals.

In some examples, receiving unit 912 can be configured to receive one or more GPS signals. In these examples, determining unit 910 can be configured to determine the first location based at least in part on the received one or more GPS signals.

In some examples, the application can include a map application. In these examples, executing unit 916 can be configured to execute the application using the selected location as the location of the first electronic device by causing, on a display (e.g., display unit 904) of the first electronic device, a display of a map and causing, on the display of the first electronic device, a display of a current location indicator overlaid on the map at a position corresponding to the selected location.

In some examples, the application can include an Internet browser application. In these examples, executing unit 916 can be configured to execute the application using the selected location as the location of the first electronic device by receiving a search query and performing the search query using the selected location.

In some examples, the first electronic device is a watch. In some examples, the second electronic device is a mobile phone.

In some examples, receiving unit 912 can be configured to receive the second location from the second electronic device via a Bluetooth connection or a Wi-Fi connection.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. A first electronic device comprising:
at least one processing unit for executing a program;
a non-transitory machine readable medium storing the program, the program comprising sets of instructions for:
   determining a first location using one or more sensors of the first electronic device;
   receiving, from a second electronic device, a second location determined by the second electronic device;
   selecting one of the first location and the second location by comparing attributes of the first and second location determinations, wherein the selecting comprises:
      determining whether at least one of:
         a time that the first location was determined is later than a time that the second location was determined by more than a predetermined length of time,
         a first area within a first error threshold from the first location intersects a second area within a second error threshold from the second location, or
         a set of one or more previous locations determined by the first electronic device were incorrect by more than a threshold distance;
      selecting the first location when at least one of:
         the time that the first location was determined is later than the time that the second location was determined by more than the predetermined length of time,
         the first area within the first error threshold from the first location intersects the second area within the second error threshold from the second location, or
         the set of previous locations determined by the first electronic device were not incorrect by more than the threshold distance;
      selecting the second location when the first location is not selected; and
   executing an application using the selected location as a location of the first electronic device.

2. The first electronic device of claim 1, wherein the set of instructions for selecting one of the first location and the second location comprises sets of instructions for:
   determining whether the time that the first location was determined is later than the time that the second location was determined by more than the predetermined length of time;
   selecting the first location when the time that the first location was determined is later than the time that the second location was determined by more than the predetermined length of time; and
   selecting the second location when the time that the first location was determined is not later than the time that the second location was determined by more than the predetermined length of time.

3. The first electronic device of claim 1, wherein the set of instructions for selecting one of the first location and the second location comprises sets of instructions for:
   determining whether an accuracy of the first location is greater than an accuracy of the second location; and
   selecting the first location when the accuracy of the first location is greater than the accuracy of the second location.

4. The first electronic device of claim 1, wherein the set of instructions for selecting one of the first location and the second location comprises sets of instructions for:
   determining whether the first area within the first error threshold from the first location intersects the second area within the second error threshold from the second location;
   selecting the first location when the first area within the first error threshold from the first location intersects the second area within the second error threshold from the second location; and
   selecting the second location when the first area within the first error threshold from the first location does not intersect the second area within the second error threshold from the second location.

5. The first electronic device of claim 1, wherein the set of instructions for selecting one of the first location and the second location comprises sets of instructions for:
   determining whether a first priority of a first source of the first location is greater than a second priority of a second source of the second location; and
   selecting the first location when the first priority of the source of the first location is greater than the priority of the source of the second location.

6. The first electronic device of claim 1, wherein the set of instructions for selecting one of the first location and the second location comprises sets of instructions for:
   determining whether the set of one or more previous locations determined by the first electronic device were incorrect by more than the threshold distance;
   selecting the first location when the set of previous locations determined by the first electronic device were not incorrect by more than the threshold distance; and
   selecting the second location when the set of previous locations determined by the first electronic device were incorrect by more than the threshold distance.

7. The first electronic device of claim 1, wherein the program further comprises a set of instructions for receiving, by the one or more sensors of the first electronic device, one or more Wi-Fi signals, wherein the set of instructions for determining the first location comprises a set of instructions for determining the first location based at least in part on the received one or more Wi-Fi signals.

8. The first electronic device of claim 1, wherein the program further comprises a set of instructions for receiving, by the one or more sensors of the first electronic device, one or more cellular signals, wherein the set of instructions for determining the first location comprises a set of instructions for determining the first location based at least in part on the received one or more cellular signals.

9. The first electronic device of claim 1, wherein the program further comprises a set of instructions for receiving, by the one or more sensors of the first electronic device, one or more GPS signals, wherein the set of instructions for determining the first location comprises a set of instructions for determining the first location based at least in part on the received one or more GPS signals.

10. The first electronic device of claim 1, wherein the application comprises a map application, and wherein the set of instructions for executing the application using the selected location as the location of the first electronic device comprises sets of instructions for:
  causing, on a display of the first electronic device, a display of a map; and
  causing, on the display of the first electronic device, a display of a current location indicator overlaid on the map at a position corresponding to the selected location.

11. The first electronic device of claim 1, wherein the application comprises an Internet browser application, and wherein the set of instructions for executing the application using the selected location as the location of the first electronic device comprises sets of instructions for:
  receiving a search query; and
  performing the search query using the selected location.

12. The first electronic device of claim 1, wherein the first electronic device includes a watch.

13. The first electronic device of claim 12, wherein the second electronic device includes a mobile phone.

14. The first electronic device of claim 1, wherein the second location is received from the second electronic device via a Bluetooth connection or a Wi-Fi connection.

15. A non-transitory machine readable medium storing a program for determining a location of a first electronic device, the program comprising sets of instructions for:
  determining a first location using one or more sensors of the first electronic device;
  receiving, from a second electronic device,
    a second location determined by the second electronic device;
  selecting one of the first location and the second location by comparing attributes of the first and second location determinations, wherein the selecting comprises:
    determining whether at least one of:
      a time that the first location was determined is later than a time that the second location was determined by more than a predetermined length of time,
      a first area within a first error threshold from the first location intersects a second area within a second error threshold from the second location, or
      a set of one or more previous locations determined by the first electronic device were incorrect by more than a threshold distance;
    selecting the first location when at least one of:
      the time that the first location was determined is later than the time that the second location was determined by more than the predetermined length of time,
      the first area within the first error threshold from the first location intersects the second area within the second error threshold from the second location, or
      the set of previous locations determined by the first electronic device were not incorrect by more than the threshold distance;
    selecting the second location when the first location is not selected; and
  executing an application using the selected location as a location of the first electronic device.

16. The non-transitory machine readable medium of claim 15, wherein the set of instructions for selecting one of the first location and the second location comprises sets of instructions for:
  determining whether the time that the first location was determined is later than the time that the second location was determined by more than the predetermined length of time;
  selecting the first location when the time that the first location was determined is later than the time that the second location was determined by more than the predetermined length of time; and
  selecting the second location when the time that the first location was determined is not later than the time that the second location was determined by more than the predetermined length of time.

17. The non-transitory machine readable medium of claim 15, wherein the set of instructions for selecting one of the first location and the second location comprises sets of instructions for:
  determining whether an accuracy of the first location is greater than an accuracy of the second location; and
  selecting the first location when the accuracy of the first location is greater than the accuracy of the second location.

18. The non-transitory machine readable medium of claim 15, wherein the set of instructions for selecting one of the first location and the second location comprises sets of instructions for:
  determining whether the first area within the first error threshold from the first location intersects the second area within the second error threshold from the second location;
  selecting the first location when the first area within the first error threshold from the first location intersects the second area within the second error threshold from the second location; and
  selecting the second location when the first area within the first error threshold from the first location does not intersect the second area within the second error threshold from the second location.

19. The non-transitory machine readable medium of claim 15, wherein the set of instructions for selecting one of the first location and the second location comprises sets of instructions for:
  determining whether a first priority of a first source of the first location is greater than a second priority of a second source of the second location; and
  selecting the first location when the first priority of the source of the first location is greater than the priority of the source of the second location.

20. The non-transitory machine readable medium of claim 15, wherein the set of instructions for selecting one of the first location and the second location comprises sets of instructions for:

determining whether the set of one or more previous locations determined by the first electronic device were incorrect by more than the threshold distance;
selecting the first location when the set of previous locations determined by the first electronic device were not incorrect by more than the threshold distance; and
selecting the second location when the set of previous locations determined by the first electronic device were incorrect by more than the threshold distance.

* * * * *

UNITED STATES PATENT AND TRADEMARK OFFICE
CERTIFICATE OF CORRECTION

PATENT NO. : 10,051,419 B2  
APPLICATION NO. : 14/842776  
DATED : August 14, 2018  
INVENTOR(S) : Aroon Pahwa and Matthew B. Ball Page 1 of 1

It is certified that error appears in the above-identified patent and that said Letters Patent is hereby corrected as shown below:

In the Claims

On Column 35, Line 47, in Claim 1 insert -- "not" -- between "were" and "incorrect".

On Column 37, Line 61, in Claim 15 insert -- "not" -- between "were" and "incorrect".

Signed and Sealed this  
Twenty-ninth Day of October, 2024

Katherine Kelly Vidal  
*Director of the United States Patent and Trademark Office*